United States Patent [19]

Sorensen

[11] Patent Number: 5,895,587
[45] Date of Patent: Apr. 20, 1999

[54] COOK-IN PACKAGE AND METHOD OF MAKING SAME

[75] Inventor: Leif B. Sorensen, St. Joseph, Mo.

[73] Assignee: Cryovac, Inc., Duncan, S.C.

[21] Appl. No.: 08/785,860

[22] Filed: Jan. 21, 1997

[51] Int. Cl.$^6$ .................................................. B23K 10/00
[52] U.S. Cl. .............. 219/121; 219/121.59; 219/121.4; 156/272.6; 264/483; 426/415
[58] Field of Search ....................... 219/121.44, 121.43, 219/121.36, 121.59, 121.4; 426/415, 410; 428/480; 156/272.6, 643.1, 646.1; 264/455, 483

[56] References Cited

U.S. PATENT DOCUMENTS

| | | |
|---|---|---|
| 2,071,300 | 2/1937 | Gammeter . |
| 2,174,924 | 10/1939 | McCleary . |
| 2,767,103 | 10/1956 | Loukomsky . |
| 3,017,302 | 1/1962 | Hultkrans . |
| 3,144,399 | 8/1964 | Rainer et al. . |
| 3,171,539 | 3/1965 | Holbrook et al. . |
| 3,227,605 | 1/1966 | Wolinski . |
| 3,294,621 | 12/1966 | Baird, Jr. et al. . |
| 3,330,748 | 7/1967 | Lawton . |
| 3,552,982 | 1/1971 | Savidge . |
| 3,607,312 | 9/1971 | Ready . |
| 3,625,348 | 12/1971 | Titchenal et al. . |
| 3,648,834 | 3/1972 | Gifford et al. . |
| 3,784,711 | 1/1974 | Kane . |
| 3,870,610 | 3/1975 | Baird et al. . |
| 3,966,980 | 6/1976 | McGuckian . |
| 4,104,404 | 8/1978 | Bieler et al. . |
| 4,120,716 | 10/1978 | Bonet . |
| 4,218,486 | 8/1980 | Bieler et al. . |
| 4,346,196 | 8/1982 | Hoh et al. . |
| 4,405,667 | 9/1983 | Christensen et al. . |
| 4,411,919 | 10/1983 | Thompson . |
| 4,536,271 | 8/1985 | Collins . |
| 4,605,460 | 8/1986 | Schirmer . |
| 4,606,922 | 8/1986 | Schirmer . |
| 4,772,348 | 9/1988 | Hirokama et al. . |
| 4,784,863 | 11/1988 | Lustig et al. . |
| 4,786,561 | 11/1988 | Fong ........................................ 428/502 |
| 4,791,303 | 12/1988 | Wyslotsky ................................ 250/492 |
| 4,855,183 | 8/1989 | Oberle . |
| 4,888,223 | 12/1989 | Sugimoto et al. . |
| 4,927,647 | 5/1990 | Bailey . |

(List continued on next page.)

FOREIGN PATENT DOCUMENTS

| | | |
|---|---|---|
| 656630 | 1/1963 | Canada . |
| 713324 | 7/1965 | Canada . |
| 717835 | 9/1965 | Canada . |
| 1078247 | 5/1980 | Canada . |
| 2744713 | 10/1977 | Germany . |
| 802747 | 1/1956 | United Kingdom . |
| 805985 | 12/1958 | United Kingdom . |

Primary Examiner—Mark H. Paschall
Attorney, Agent, or Firm—David G. Burleson

[57] ABSTRACT

An improved food package comprises a cook-in film encasing an in situ aqueous medium cooked meat product. The film has a polymeric olefin containing inner surface in adhering relation to the cooked meat product. The film inner surface is treated by a cold plasma in a confined region which has been evacuated to a pressure less than atmospheric pressure and to which a selected process gas other than air and containing less than 30% nitrogen has been added which results in a gas plasma that reacts with a film surface during cold plasma treatment to increase the surface energy of the film to more than 44 dynes/cm and provide a film that is both heat sealable to the package with an acceptable bond strength for sealing the package, and capable of adhering in a uniform and well controlled manner to the cooked meat product during cook-in without purge. The polymeric olefin containing inner surface can be formed of linear low density polyethylene, for example, to provide a relatively low cost food package from material whose meat adhering and heat sealing properties have an excellent shelf life. The plasma treating gas is preferably pure oxygen or a mixture of oxygen and nitrogen containing less than 30% nitrogen.

28 Claims, 6 Drawing Sheets

U.S. PATENT DOCUMENTS

| | | |
|---|---|---|
| 5,047,253 | 9/1991 | Juhl et al. . |
| 5,139,804 | 8/1992 | Hoffman . |
| 5,328,705 | 7/1994 | Wilhoit et al. . |
| 5,376,394 | 12/1994 | Dudenhoeffer et al. ............... 426/415 |
| 5,407,611 | 4/1995 | Wilhoit et al. ............................. 264/22 |
| 5,419,795 | 5/1995 | Wood et al. ............................. 156/184 |
| 5,468,560 | 11/1995 | McPherson et al. ..................... 428/413 |
| 5,487,920 | 1/1996 | Lopata et al. ............................ 427/489 |
| 5,534,232 | 7/1996 | Denes et al. ............................. 422/186 |
| 5,536,807 | 7/1996 | Gruber et al. ............................ 528/354 |
| 5,576,068 | 11/1996 | Caburet et al. .......................... 427/452 |

COOK-IN PACKAGE AND METHOD OF MAKING SAME

FIELD OF THE INVENTION

The present invention is directed to an improved food package, and more particularly to a food package comprising a cook-in film encasing a food product such as an in situ aqueous medium cooked meat product to which the film is adhered, and to a method of making the food package.

BACKGROUND OF THE INVENTION

It is known to provide a flexible plastic container which is conformable to a meat product such as poultry, ham, beef or bologna contained therein and whose inside wall portions are meat adherent during cook-in of the product in the package as for pasteurization, for example. The meat adherency of the inside wall portions enhances yields of the cook-in package meat product by minimizing and preferably substantially preventing cook-out, also referred to as purge, of fluids from the meat product in the plastic container in which the meat product is cooked. Examples of such containers include a stuffable type container wherein meat is initially compacted against the walls of a somewhat resilient container member such as a tubular casing or the like, and a container which has heat shrinkable characteristics such that the container shrinks at cooking temperatures for bringing the container in its sealed configuration into a close conforming condition relative to the meat contained therein so that meat product configuration changes during the cook-in process are compensated for by the container shrink characteristics.

U.S. Pat. No. 4,411,919 to Thompson discloses cook-in of packaged meat using an energetic radiation treated, meat adherent inner container surface comprising a polymeric olefin. U.S. Pat. No. 4,606,922 to Schirmer teaches using an irradiation treated ionomer layer as the meat adherent inside surface of a meat cook-in container. U.S. Pat. No. 4,888,223 discloses a multi-layer plastic film provided with an innermost layer of polyolefin resin which has been treated by corona discharge to improve its meat adhesion.

Such known meat adhering cook-in packages, particularly in certain use circumstances, display several disadvantages. These include that when the meat package encases meat having a retained skin, such as turkey or other poultry meat, the meat adherent interior surface of the package film can be so aggressively adherent to the skin as to result in undesirable delamination and separation of the skin from the cooked meat at the time when the package is removed from the meat following cook-in. Thus, as explained in U.S. Pat. No. 5,139,804 to Hoffman, even though the problem of purge or cook-out of fluids has been overcome, the resulting separation of skin from meat is considered to be commercially disadvantageous.

Another problem with the known cook-in packaging art involving a plastic container is that it is difficult, and apparently in some cases impossible, to correlate the amount of irradiation or corona discharge treatment or even ozone treatment uniformly given to a plastic surface with the subsequent degree of meat or other high protein adherence thereto. In such cases, the degree or extent of meat adherence does not appear to be regulatable by the amount of uniform surface treatment which is preliminarily given to the meat contacting surface portions of the intended cook-in container to be used for meat processing (preferably without purge).

Hoffman also states in U.S. Pat. No. 5,139,804 that a further problem in cook-in packaging art is that uniform surface treatment of the intended interior surface portions of the cook-in container, which treatment is carried out for the purpose of improving the capacity of highly proteinaceous foods to adhere thereto, appears to detract from the ability of the treated surface to adhere by heat sealing to similarly treated surfaces of plastics having even an identical composition. Hoffman explains that this is important because filled cook-in plastic containers are typically sealed before being exposed to cooking temperatures by heat sealing adjacent inner wall surface portions together as at the mouth or lip region of the container. Since steam and/or liquid pressures within the sealed container can develop, for example, in the cooking of beef at about 200° F., or in cooking ham or turkey breast at 165° F. for several hours, for example, unless durable container seals are formed, they tend to open during cooking with undesirable effects.

Hoffman reports that where the interior surface portions are treated with corona discharge, gamma radiation, ozone, etc., slight alteration in treated surface composition results. The chemical nature of this alteration is not known, but it is believed to involve at least some oxidation (perhaps partially oxidized) surfaces brought together and heat sealed, the resulting seal tending to be weaker than the corresponding seal formed between untreated surfaces. This effect thus presents a problem in providing containers for cook-in of meat and other highly proteinaceous foods when the container inside walls are to be both adherent to such foods in order to achieve, for example, a purge free cooked-in product package, and heat sealed together in formation of the package prior to cook-in. This problem can be avoided by using metal clips to close the package ends rather than heat sealing the package. However, when both good adhesion of the plastic film of the package to highly proteinaceous food and heat sealability of the film to itself or similar material for closing the package prior to cook-in are required, in the past one common practice has been to use a special, higher cost plastic film having both characteristics as discussed hereinafter, or to use a lower cost material such as a polymeric olefin for the film whose surface energy (wettability) is increased by a corona discharge treatment of the film in air so as to compromise the contradictory increase in adhesion and the decrease in heat sealability of the treated film to an amount sufficient for both meat adherence and heat sealing.

As an example, it is known to employ a relatively low cost, polymeric olefin film, particularly linear low density polyethylene film, in a heat sealable cook-in package for poultry by corona discharge treating the film in air to increase its initial surface energy from about 29 dynes/cm to about 42 dynes/cm to improve the meat adhesion characteristic of the film while still retaining a heat sealing capability. However, because of this compromise the package is not totally satisfactory in that it has a limited adhesion which makes it unsuitable to prevent purge for some meat formulations including ham, for example. If the surface energy of the film is increased to greater than 44 dynes/cm by the treatment, the film becomes impossible to heat seal and there is a tendency for the material to stick or adhere to itself on a roll to prevent or block unwinding the film from a roll.

A proposed solution to these problems as presented in U.S. Pat. No. 5,139,804 to Hoffman is to selectively surface treat the plastic materials in a patterned manner with the corona discharge. The preferred pattern has relatively small repeating units of treated and non-treated areas. Respective contacting surfaces heat sealed together with heat seals are obtained which display overall improved bond strengths. The selective surface treatment variations (corresponding to the treatment patterns) are such that areas of non-treatment in one surface align with other areas of non-treatment in the adjacent contacting surface intermittently along the length of an elongated sealed region formed by heat sealing. Hoffman states that the configurations associated with a treatment pattern can be used to enhance the increased bond strengths achieved in the heat sealed regions. In a disclosed embodiment in the patent, an engraved steel applicator roll is employed to provide the desired pattern of corona discharge treatment on the plastic film.

More recently, Wilhoit et al. proposed a cooked food product package, see U.S. Pat. No. 5,328,705, wherein an EVA-containing film surface is both irradiated and subjected to corona discharge treatment to provide an improvement in purge reduction and food adherence even through there is no commensurate increase in wetting tension of the treated surface over a corona discharge treated, but nonirradiated film. Starch particles are preferably dispersed across the meat contacting surface which is both irradiated and subjected to corona treatment. However, this and the aforementioned other proposed solutions to the above-referred to problems have not been totally satisfactory. For example, as noted above, corona discharge treatment of the film surface lowers heat sealability in the case of a polymeric olefin such as linear low density polyethylene. Corona discharge treated plastic film also has a relatively short shelf-life in that it loses its good properties of meat adhesion within a period of approximately 90 days. When stored longer than this the film must be retreated by corona discharge before use in cook-in packaging.

As mentioned before, special plastic films have been developed for overcoming these problems. Surlyn, a trademark of E.I. du Pont de Nemours & Co. for a group of ionomer resins, is an example of such materials. These materials are generally more costly and not always totally satisfactory. Some Surlyn materials, for example, can lose their meat adhesion property over an extended period of time such as twenty months. The expense of treatment equipment such as electron beam accelerators for irradiating plastic film also poses a difficulty, along with safety concerns as to the high-levels of radiation doses employed in the use of such equipment.

Cold plasma treatment of plastic films is, per se, known. For example, U.S. Pat. No. 3,870,610 to Baird, et al., discloses examples of treating polymeric materials in air and helium cold plasmas to improve their wettability and ink adhesion in preparation for printing. Thompson, in his aforementioned U.S. Pat. No. 4,411,919 refers to the patent to Baird, et al. as being of general interest in disclosing one of various oxidative treatments including corona discharge, flame, plasma, and ultraviolet light treatment contemplated by Thompson for use in improving the meat adherence of plastic film for cook-in packages. However, the examples disclosed by Thompson are limited to the highly energetic radiation treatments of irradiation by electron beam from an electron beam accelerator and corona discharge treatment, both being conducted in the presence of air. Disadvantages and drawbacks associated with making cook-in packages using such treatments and films have been referred to above.

Cold plasma treatment, also referred to as low temperature, 50°–120° C., plasma treatment has been employed to increase the tensile strength of polymer film as disclosed in U.S. Pat. No. 4,536,271 to Collins. Collins states that several modes of modification of the film properties by the cold plasma treatment include etching, cross-linking and coating of the film surface, depending on the treatment gas employed. Numerous possible organic and inorganic treatment gases are referred to by Collins in this regard. Other cold plasma process variables identified in the patent include the concentration of the treatment gas, absolute pressure during treatment, film exposure time to the reactive medium, and electrical power, voltage and current employed to excite the treatment gas. The patent to Collins does not relate to cook-in packages and does not address the aforementioned problems encountered in providing an improved cook-in package having a surface which has both well controlled, uniform meat adhesion and good heat sealability.

U.S. Pat. No. 4,772,348 to Hirokawa et al. discloses a method of making a gas barrier laminate of a thermoplastic layer and a layer of saponified copolymer of ethylene and vinyl acetate coextruded or thermally bonded to one another. The laminate is stated to be useful for forming containers or as a packaging film or sheet for food products, beverages and pharmaceutical products. The surface of the thermoplastic layer to be laminated with the layer of saponified copolymer of ethylene and vinyl acetate is pretreated with a low temperature plasma in a gaseous atmosphere of air, argon, nitrogen, oxygen, hydrogen, helium or a mixture of those gases, to permit lamination of the two layers. The thermoplastic layer is polyethylene terephthalate in a disclosed embodiment in the patent but according to the patentees it can be a thermoplastic film or sheet of a member selected from the group consisting of polyesters, polyamides, polycarbonates, polyvinyl chloride, polyolefins, polystrene and polyacrylonitrile, or a laminated film or sheet having at least one layer of one of said members. Hirokawa et al. are not concerned with nor do they suggest providing a cook-in package having an inner surface for contacting a proteinaceous food product such as a meat product, the inner surface having both a well controlled, uniform adherence to the food product and a good heat seal strength when heat sealed to a like surface for sealing the package before cooking.

Thus, there is a need for an improved cook-in package and a method of making the same which avoid the aforementioned drawbacks and limitations of the known cook-in packages and methods of making the same. An object of the present invention is to provide an improved cook-in package and method of making the cook-in package which solve these problems. More particularly, an object of the present invention is to provide an improved cook-in package comprising a cook-in film having a surface preferably formed of a relatively low cost polymeric olefin containing plastic material, which is both heat sealable to the package with an acceptable bond strength for sealing the package, and is capable of adhering in a well controlled and uniform manner to a highly proteinaceous food product such as meat cooked therein, wherein the improved cook-in package has a relatively long shelf-life with respect to retaining these characteristics as compared with the shelf-life of conventional packages.

Another object of the present invention is to provide an improved cook-in package and a method of making the same wherein meat adhesion of the film of the package is well controlled and uniform to prevent delamination and separation of the skin from the cooked meat where the meat has a retained skin, and to prevent overly aggressive adhesion of the film to itself when wound on a roll or to the meat after cook-in while still preventing purge during cook-in of various food products including ham, this being accomplished in a relatively safe, quick and inexpensive manner, without requiring the use of special, relatively expensive film material for the package.

SUMMARY OF THE INVENTION

These and other objects are attained by the improved food package and method of making the same of the present invention wherein the food package comprises a cook-in film encasing an in situ aqueous medium cooked meat product, the film having a polymeric olefin containing inner surface in adhering relation to the cooked meat product, the film inner surface having been treated by a cold plasma in a confined region which has been evacuated to a pressure less than atmospheric pressure and to which a selected process gas other than air has been added which results in a gas plasma that reacts with the film surface during cold plasma treatment to increase the surface energy of the film to more than 44 dynes/cm and provide a film that is, surprisingly and unexpectedly, both heat sealable to the package with an acceptable bond strength for sealing the package, and capable of adhering to the meat product or other proteinaceous food product during cook-in in a well controlled manner so as to prevent cook-out or purge.

It has been found that these results can be obtained when the selected process gas during cold plasma treatment is a highly oxidizing gas or mixture of gases and the surface energy is increased to at least the aforementioned level. More particularly, tests have shown in connection with the disclosed embodiments that the use of pure oxygen or oxygen containing less than 30% nitrogen as the process gas in the cold plasma treatment of a polymeric olefin containing surface of a plastic film provides a film which is useful as a cook-in film in a cooked food package wherein the film is both heat sealable to the package with an acceptable bond strength for sealing the package, and capable of adhering to the cooked product such as meat during the cook-in in a uniform and well controlled manner. This advantageous combination of characteristics is obtained without requiring use of special pattern treatments of the film as in U.S. Pat. No. 5,139,804 and without requiring the combination of treatments of irradiation at relatively high dosage levels with an electron beam and corona discharge treatment as in U.S. Pat. No. 5,328,705. These results of the invention are not attained when the film is cold plasma treated in an air plasma or a helium plasma as in Baird, et al., U.S. Pat. No. 3,870,610, where the treatments are for improving the ink adhesion of plastics. oxygen and nitrogen gas mixtures can be used as long as the nitrogen is less than 30%.

The food package in the disclosed embodiments of the invention comprises at least one heat seal of the film to the package for sealing the package. The heat seal has a bond strength sufficient to resist seal failure during the cooking, e.g. pasteurization of the meat product in the package. In the disclosed embodiments, two like surfaces of the film are heat sealed to each other at the heat seal. The package may be in the form of a bag made from flat sheet with a back seam or from a tube of plastic film heat sealed across its open ends at intervals for encasing a food product. The plastic film of the package may be heat shrinkable.

The polymeric olefin containing inner surface of the package can be polyethylene, polypropylene or EVA, for example. The term "polymer" and similar terms are used herein in the conventional sense to include homopolymers, copolymers, terpolymers, and the like; and the term "polymeric olefin" is intended to include polymers having a major constituent of polymeric olefin. In the preferred embodiments the polymeric olefin containing inner surface of the package is formed of linear low density polyethylene, LLDPE. The film of the package can be a multi-layer film or a monolayer. It may have heat shrink properties but need not and it can also be in flat form or tubing as noted above.

The level of energy to which the film is exposed during cold plasma treatment according to the invention is relatively low, at least an order of magnitude less than that used in corona discharge or electron beam treatments where high levels of radiation are used. The surface of the film is cold plasma treated in the presence of the selected process gas so that the surface energy of the film is increased by the treatment to above 44 dynes/cm and preferably to at least 50 dynes/cm. The film and package made therefrom advantageously have a shelf life of at least several years with respect to retaining both their desirable meat adherence and heat sealability characteristics.

Thus, the method of making a food package according to the present invention comprises providing a film having a polymeric olefin containing surface, treating the polymeric olefin containing surface of the film with a cold plasma in a confined region which has been evacuated to a pressure less than atmospheric pressure and to which a selected process gas other than air has been added which results in a gas plasma which reacts with the film's surface during cold plasma treatment to provide a film that is heat sealable to itself with an acceptable bond strength for sealing the food package. The method further comprises forming a food package encasing a food product using the treated film, the forming including making at least one heat seal of the film to the package, the heat seal having an acceptable bond strength for sealing the package. In the disclosed embodiment of the invention, the method involves encasing a food product which is a proteinaceous material such as a meat product, the method further including cooking this meat product in the food package. The cold plasma treated polymeric olefin containing surface of the film adheres to the food product during the cooking period in a uniform well-controlled manner to prevent purge. Other foods, such as cheese, may also be packaged with the improved package of the invention, with or without cook-in after sealing the package about the product.

These and other objects, features and advantages of the present invention will become more apparent when taken in connection with the following detailed description of the disclosed embodiments of the present invention together with the accompanying drawings.

DETAILED DESCRIPTION OF DISCLOSED EMBODIMENTS

Figure 1:
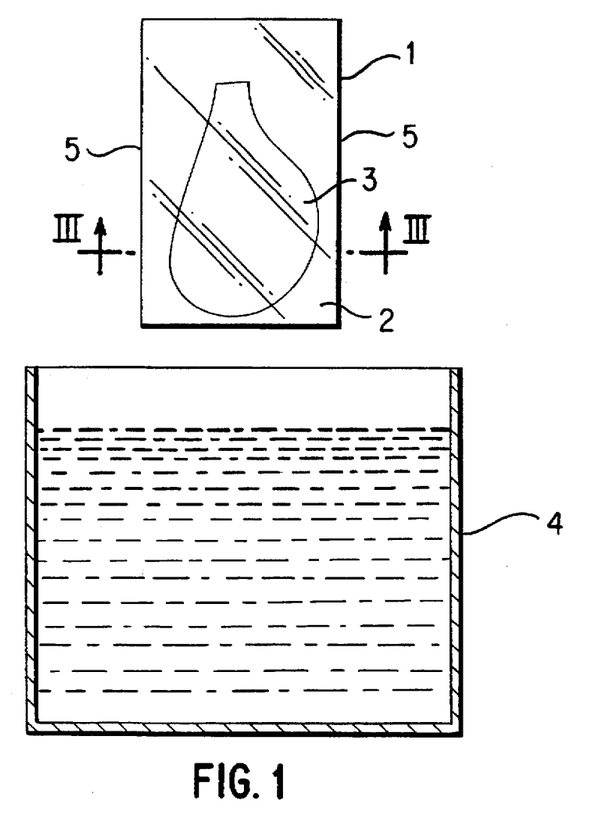
FIG. 1 is a side view of a cook-in package according to the invention, the package being heat sealed and containing a meat product with the package shown above a cooking container into which the package is to be placed for cooking.
Figure 2:
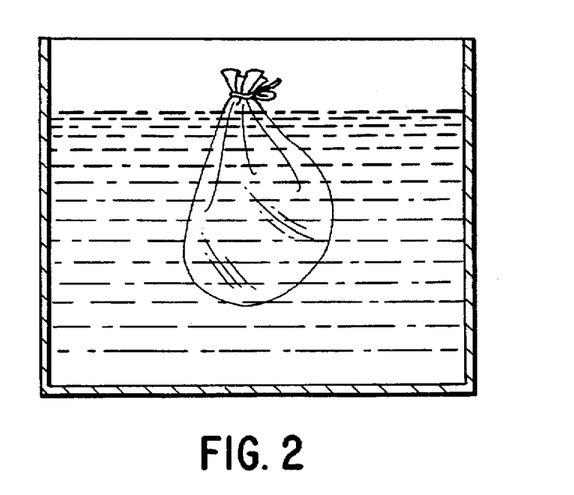
FIG. 2 is a side view like FIG. 1, showing the package immersed in heated water in the cooking container for cooking the meat product within the package, the package having shrunk from the heat of cooking with its inner surface adhering to the meat product.

Referring now to the drawings, a food package 1 according to the invention is depicted in FIG. 1. The package 1 comprises a cook-in film 2 encasing a meat product 3 to be cooked in a cooking container 4 containing heated water. The meat product 3 in the disclosed embodiment is ham, but other highly proteinaceous food products could be packaged including beef, poultry and cheese.

The film 2 of the package 1 has a polymeric olefin containing inner surface which will adhere to the meat product during cooking. The film inner surface has been treated by a cold plasma in a confined region which has been evacuated to a pressure less than atmosphere pressure and to which a selected process gas other than air and relatively low in nitrogen, less than 30% nitrogen, has been added which results in a gas plasma that reacts with the film surface during cold plasma treatment to provide a film whose surface energy is increased to above 44 dynes/cm and preferably greater than 50 dynes/cm. Surprisingly, when the film is treated according to the invention it is both heat sealable to the package with an acceptable bond strength for sealing the package even during cooking-in, and capable of adhering in a well controlled and uniform manner to the cooked meat product during cook-in. Even in the case the meat product is ham, there is no cook-out or purge. The film also does not stick to itself to block unwinding the film from a roll and the film has a longer shelf life than conventionally treated packaging film as referred to previously.

More specifically, tests have shown that these results can be obtained when the selected process gas during cold plasma treatment is a highly oxidizing gas or mixture of gases containing less than 30% nitrogen and the power and time of plasma treatment are chosen to increase the surface energy to at least the aforementioned level. Preferably pure oxygen or a mixture of oxygen and nitrogen containing less than 30% nitrogen is used as the process gas in the cold plasma treatment of the polymeric olefin containing surface according to the invention. The plastic film is useful as a cook-in film in a food package wherein the film is both heat sealable to a like or similar surface of the package at a relatively low temperature of 140° C., for example, with an acceptable bond strength for resisting seal failure during cook-in, and capable of adhering to the cooked product such as meat during the cook-in in a well controlled and uniform manner without purge or cook-out of liquids. These results are not obtained when the film is treated in an air plasma, a nitrous oxide plasma or even an oxygen plasma containing 30% or more nitrogen.

Figure 3:
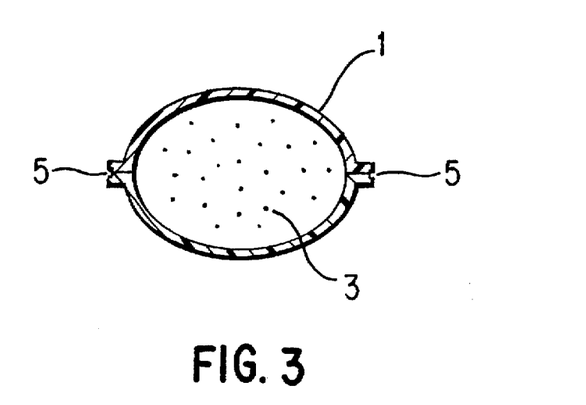
FIG. 3 is a cross-sectional view through the package of FIG. 1, after cook-in, taken along the line III—III and showing the relationship of the heat seal and film surface adhering to the meat product.
Figure 4:
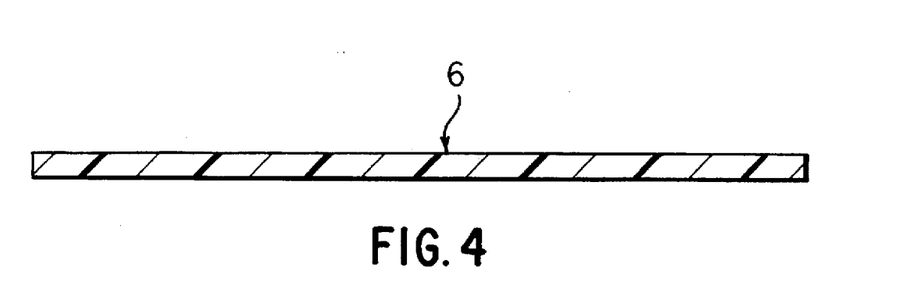
FIG. 4 is an enlarged cross-sectional view through a monolayer film for forming the cook-in package according to one form of the invention.

The package 1 containing the ham 3 in the embodiment of FIG. 1 is formed of a single sheet of film folded on itself in the middle and heat-sealed along the sides adjacent the fold, making a bag closed on three sides and closed across the top. The air within the package is withdrawn by vacuum prior to heat sealing the top of the package. The heat seals are identified by reference numeral 5 in FIGS. 1 and 3. The film 2 can be a monolayer 6 as depicted in FIG. 4, or a multi-layer film such as the three layer laminate or coextrusion 7 shown in FIG. 5. In the disclosed embodiments, the monolayer 6 of the film in FIG. 4 is formed of a polyolefin material, particularly a linear low density polyethylene having a thickness which is preferably within the range of 25 to 250 microns. The monolayer is cold plasma treated in the selected, reactive process gas according to the invention to provide a surface, energy which is increased to above 44 dynes/cm, and preferably to above 50 dynes/cm which will adhere to the ham 3 in a uniform and well controlled manner during cook-in thereby preventing purge, and which is well heat sealable to an opposing surface of like material at heat seals 5 formed at 140° C., for example, which heat seals have sufficient bond strength to resist failure during cook-in for sealing the package.

Figure 5:
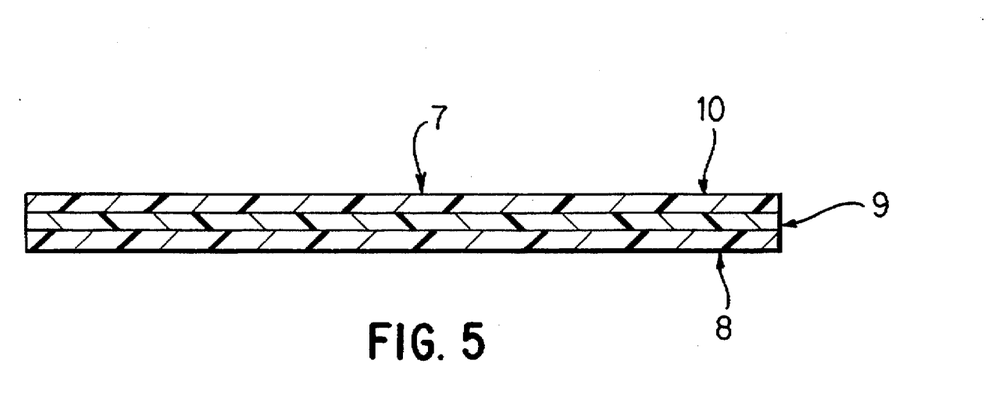
FIG. 5 is a enlarged cross-sectional view through a extruded or laminated multiple layer film for forming the cook-in package according to another form of the invention.

The multi-layer film 7 in FIG. 5 includes a polymeric olefin containing inner layer 8 for contacting the food product, an intermediate adhesive layer 9 and an outermost base layer 10. The materials of adhesive layer 9 and base layer 10 can be selected to provide the necessary gas barrier property and strength for the film, depending upon the polymeric olefin employed as the inner layer 8. The base film 10 preferably has a high impact resistance and high abrasion resistance. Examples of suitable film for base layer 10 include polyamide 6, polyamide 6.6, copolymers thereof and like polyamide resins, polyester resins, polyacrylonitrile resins, etc. The intermediate layer 9 may be of one laminate ply or two or more laminate ply structure. A wide range of resins can be used for forming the intermediate layer. Examples thereof are modified polyolefin resins, ionomer resins, ethylene-ethyl acrylate resins, ethylene-acrylic acid resins, ethylene vinyl alcohol copolymers, aromatic polyamide resins, ethylene-methacrylic acid copolymer, mixtures thereof, etc. When the film of the food package 1 is a multi-layer film such as the film 7 in FIG. 5, it is the inner layer 8 which is treated by a cold plasma according to the invention in the manner referred to above, preferably before laminating it with layers 9 and 10, or after coextrusion of the film. The surface of layer 8 contacts the meat product in the package and also is heat sealed to a like surface on the opposing film at heat seals 5. The film of the invention can be a heat shrinkable material as noted above but need not have such a characteristic.

Figure 6:
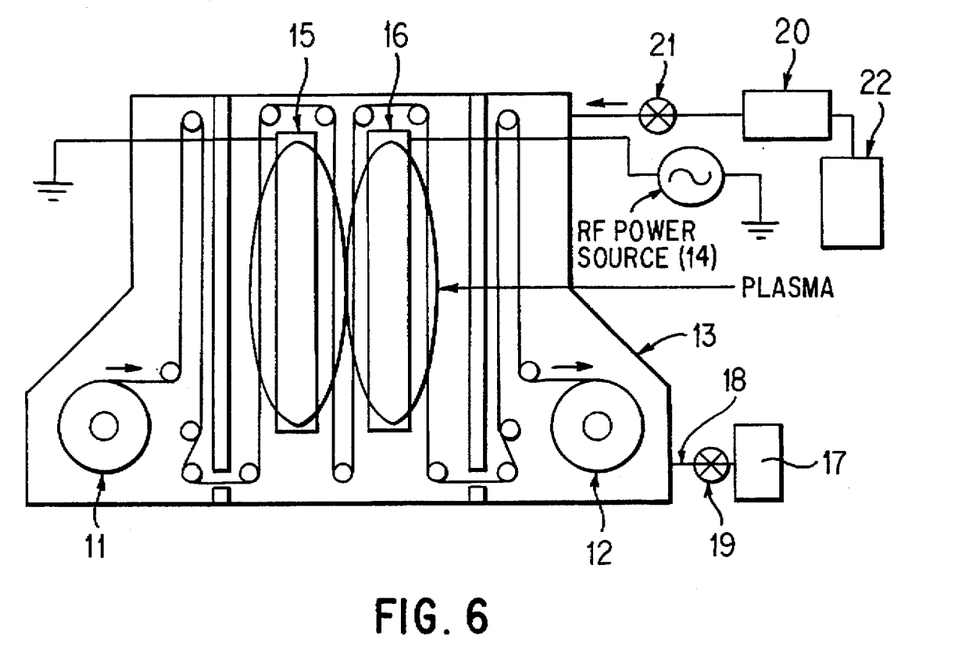
FIG. 6 is a schematic side view of an apparatus for cold plasma treating a film for making the improved cook-in package of the invention.

The cold plasma treatment of the surface of a flat strip of the polymeric olefin containing film is depicted in FIG. 6. As shown therein, a supply roll 11 and a take up roll 12 are rotatably supported within a chamber 13 for movement through a primary plasma generated directly by radio-frequency energy from RF power source 14 between electrodes 15 and 16 within the chamber. The chamber 13 has a door, not shown, which can be opened and closed for loading and unloading the film being treated. Once a supply roll 11 of film to be cold plasma treated is loaded within the chamber 13 and the door closed, the pressure within the chamber 13 is evacuated to a base pressure between 0.03 and 10 Torr by a vacuum system 17 in communication with the interior of the chamber 13 by way of conduit 18 and valve 19. To rapidly achieve the low pressure for plasma treatment, the vacuum system 17 can comprise a mechanical vacuum pump backed by a blower. The RF power source 14 preferably comprises a radio frequency generator operating at 13.56 MHz through an impedance-matching circuit to make efficient use of power and protect the RF generator. Thus, power to the plasma and the containers is in the form of radio frequency electricity. The RF power source 14 in the disclosed embodiment supplies up to 2500 watts.

Figure 10:
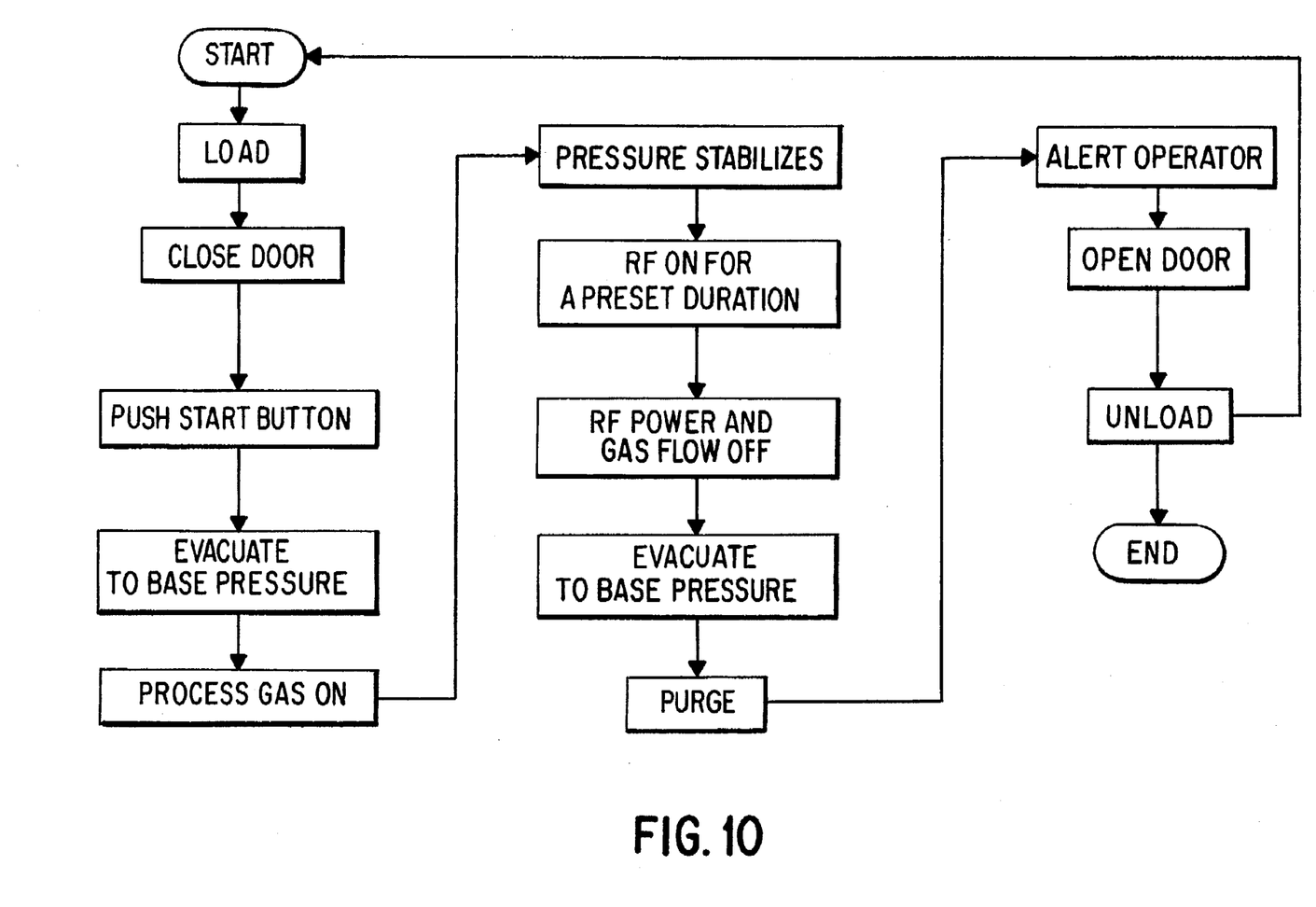
FIG. 10 is a flow chart of steps for plasma treating the film with the apparatus of FIG. 6.

Once the pressure within the chamber 13 has been evacuated to base pressure, the selected process gas other than air and containing less than 30% nitrogen, preferably a highly oxidizing gas, or mixture of gases, containing less than 30% nitrogen, is supplied to the chamber 13 from a gas flow module 20 controlled by a controller 21 shown schematically in FIG. 6. The controller 21 can be a needle valve with a floating ball meter, or a mass flow controller. A plasma process cycle for treating the film 2 is shown in FIG. 10. Following process gas entering the chamber, the reaction chamber pressure is allowed to stabilize, and the RF power is switched on. This creates the cold plasma between the electrodes 15 and 16. The plasma is a primary plasma for uniformly treating the surface of the film 2. The plasma is allowed to stabilize and the film 2 is then advanced from the supply roll 11 to the take up roll 12. The speed of movement of the film through the primary plasma and the power of the generator can be adjusted for cold plasma treating the film a sufficient period of time, from a few seconds to one minute or more, for increasing the surface energy of the film to the aforementioned level or higher and achieving a surface which as the inner surface of the cook-in package which will provide both a well controlled meat adhesion characteristic even for ham and good heat sealing property as discussed above.

Figure 7A:
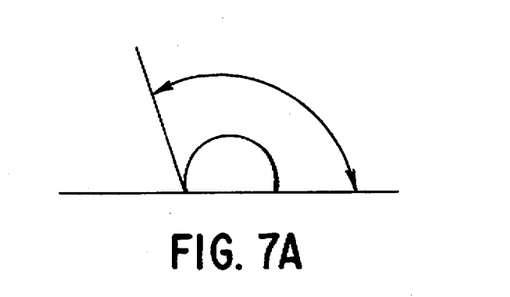
FIG. 7A is a schematic illustration of a drop of water on a plastic film having a relatively low surface energy.
Figure 7B:
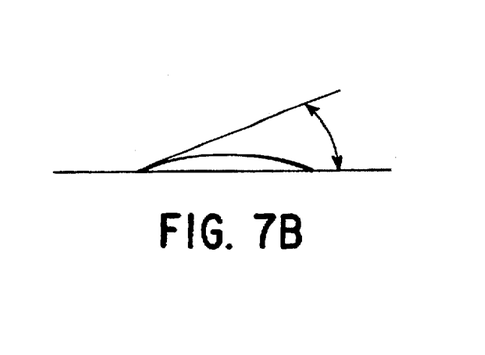
FIG. 7B is a schematic illustration of a drop of water on a plastic film which has been cold plasma treated according to the invention so that its surface energy is increased from 30 dynes/cm to 70 dynes/cm.

One effect of the cold plasma treatment of the surface of the film 2 in the chamber 13 is to increase the surface energy of the film. For example, the surface energy of a linear low density polyethylene film may initially be around 29 dynes/cm, but after movement through the cold plasma of the selected, low pressure gas atmosphere within the chamber 13 the surface energy of the film is increased to above 44 dynes/cm, and preferably to above 50 dynes/cm. The change in the surface energy of the plastic film can also be shown by contact angle measurements. A standard drop of distilled water on the untreated plastic substrate in FIG. 7A exhibits a relatively large contact angle, greater than 90° between the plane of the surface of the plastic substrate and a tangent to the water drop thereon. After cold plasma treatment, as shown in FIG. 7B, the surface exhibits improved wettability as the contact angle is reduced to 15–20°, for example.

Figure 8:
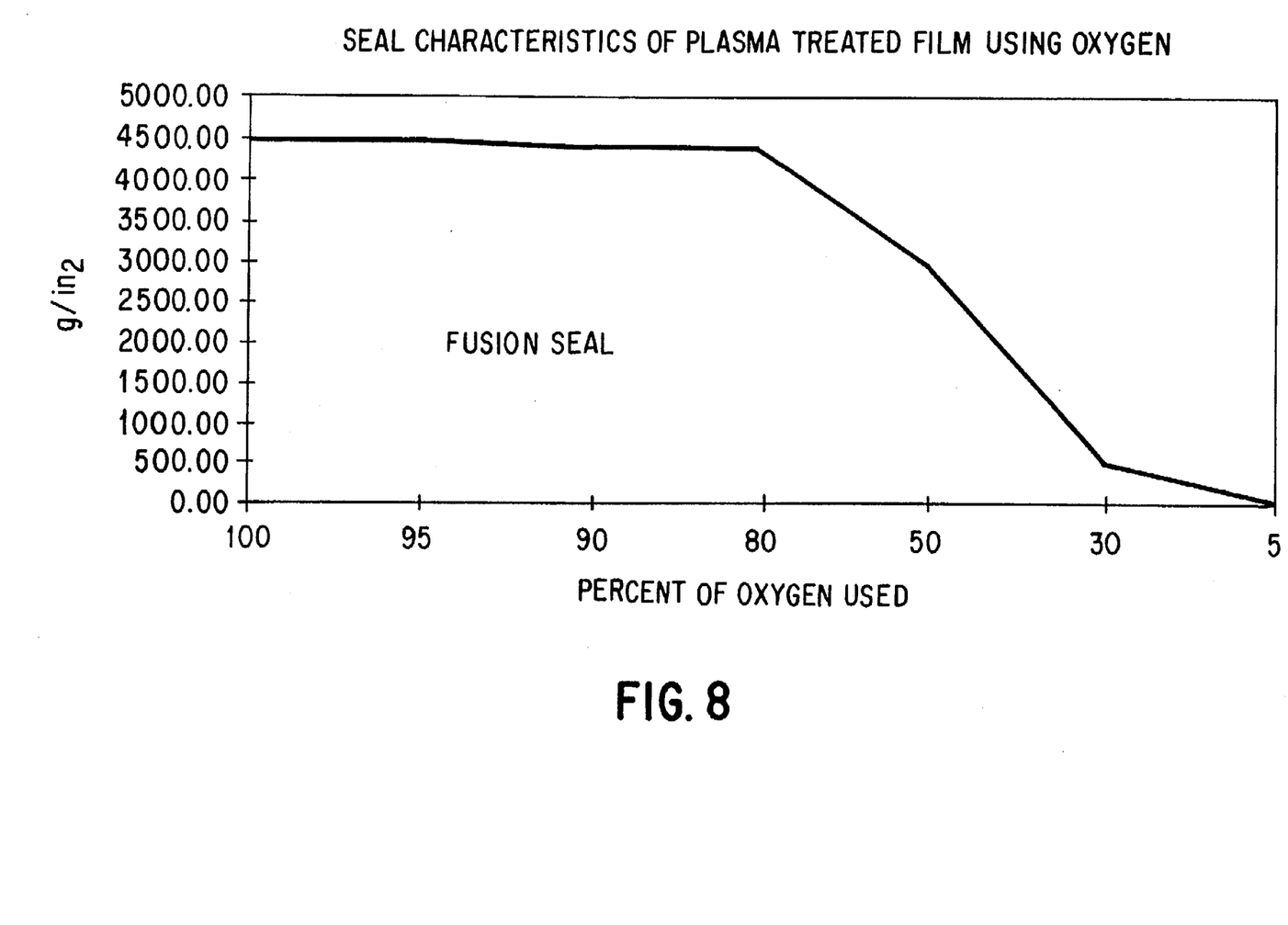
FIG. 8 is a graph depicting the tensile strength of heat seals across 1" wide stripes of the cook-in package film heat sealed together at 140° C., as a function of the reactive gas content during cold plasma treatment, for pure oxygen (100%) and for various mixtures of oxygen and nitrogen.

The results of tests of heat seals strength between like surfaces of opposed films as a function of various process gases, from pure oxygen, 100% oxygen, to various proportions of oxygen and nitrogen including a 30% oxygen, 80% nitrogen mixture, by volume, which approximates atmospheric air, are shown in FIG. 8. As seen from the graph, the tensile strength of the heat seals made at 140° C. drops off significantly when 30% or more of nitrogen is mixed with the oxygen. From these results, it can be seen that when the process gas of the cold plasma treatment is carefully selected to be highly oxidizing, and containing less than 30% nitrogen, and the surface energy of the film is increased to above 44 dynes/cm, and preferably above 50 dynes/cm during the cold plasma treatment, there is a surprising and unexpected improvement in or coexistence of both a capability of the cook-in package film to be heat sealable to the package with an acceptable bond strength for sealing the package during cook-in, and a characteristic of sufficient adhesion to the cooked meat product to prevent purge during cook-in even in the case of packaging ham or other meat formulations.

In the apparatus of FIG. 6, the electrodes 15 and 16 are each in the form of an electrode plate which is 50 inches wide and 48 inches high. The separation of the electrodes can be 3–4 inches, for example. In cold plasma treatment, after evacuation of the chamber 13 to a low pressure, 0.32 Torr for example, the special gas atmosphere, preferably pure oxygen or a mixture of oxygen and nitrogen containing less than 30% nitrogen, from a compressed gas source of gas flow module 20 is delivered to the chamber 13 at a flow rate of 10 liters/minute, for example. The use of relatively high gas flow rates of 5–10 liters/minute minimizes the influence of off gassing of the material being treated. The vacuum system 17 continues to operate, constantly pumping the chamber, and the RF power source 14 is turned on to create a primary plasma about the electrodes. The power source 14 can be set to operate at full power, 2500 watts, or a lower power, for example 40% power or 1000 watts, during treatment. The speed of the film through the cold plasma can be set at a desired rate to achieve a residence time in the primary plasma sufficient for raising the surface energy of the film to at least the aforementioned level. For example, the speed of travel of the film during treatment can be 60 feet/minute–210 feet/minute.

While a radio frequency power source is used to create the cold plasma, audio frequency or microwave range frequency power sources could be used to form the plasma. In the disclosed embodiment the voltage across the electrodes during the plasma treatment can be as high as several hundred volts, for example 600 volts. The bulk properties of the film being treated are not changed by the cold plasma treatment, only the surface of the film to a depth of 40 Angstroms or less, is changed as a result of the treatment.

The test results shown in FIG. 8 were made with fin heat seals of 1 inch wide plastic film strips treated according to the invention followed by heat sealing two strips together across the width of the strips under pressure between opposing heated bars at a temperature of 140° C. The maximum tensile strength to failure attained with the use of pure oxygen as the treatment gas was 4500 grams/in$^2$ for the 1 inch wide strips as shown in FIG. 8. Acceptable heat seal strength for resisting seal failure during cook-in was achieved only for pure oxygen or mixtures of oxygen and nitrogen containing less than 30% nitrogen by volume. Use of nitrous oxide or air as the treatment gas or a mixture of oxygen and nitrogen containing 30% or more of nitrogen were found to lack sufficient heat seal strength. The surface energy must be greater than 44 dynes/cm and is preferably greater than 50 dynes/cm. Satisfactory results for cook-in packages have been attained with surface energy levels as high as 58 dynes/cm–72 dynes/cm.

Figure 9:
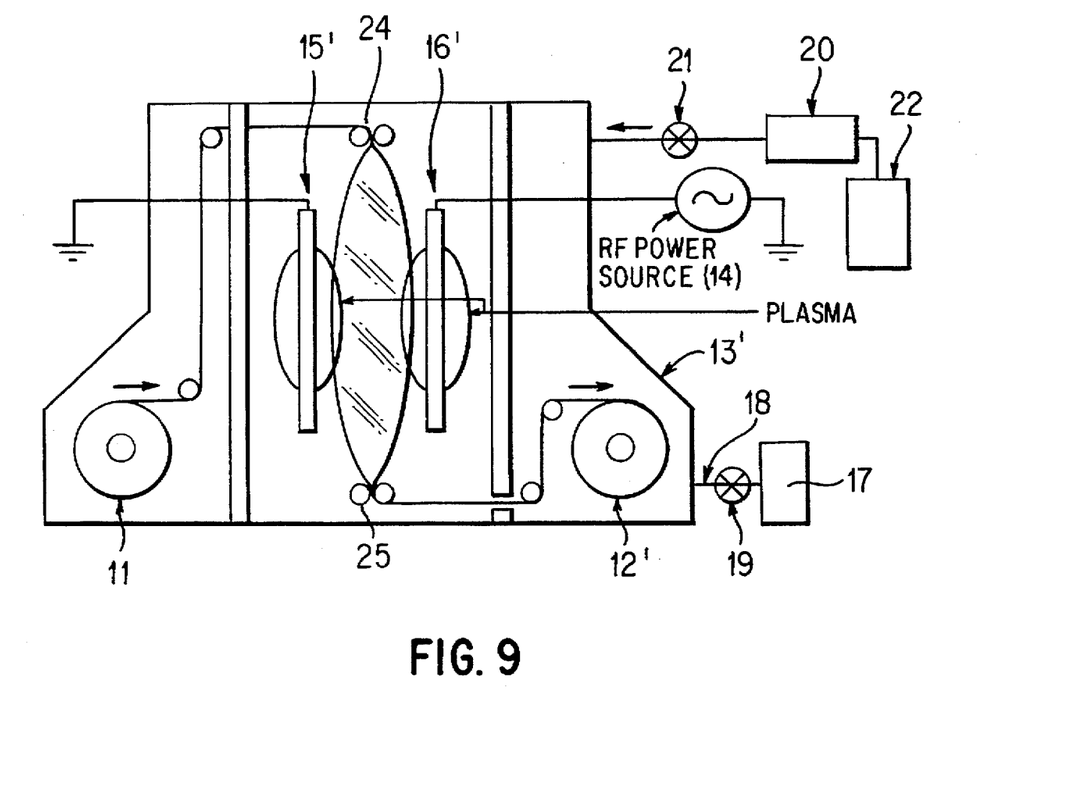
FIG. 9 is a schematic side view of a portion of an apparatus for cold plasma treating the inner and outer surfaces of a plastic film tube according to the invention for use in making bags.

The apparatus 23 shown schematically in FIG. 9 is for cold plasma treating a tube of plastic film, either blown or manufactured by folding over and making a back seal. The flattened tube is supplied from supply roll 11'. In this case the electrodes 15' and 16' are located outside the tube which is inflated with the treatment gas through a slit formed in the tube (not shown) within a vacuum chamber 13'. The slit is sealed over as by the use of tape and the chamber evacuated and treatment gas is supplied to the vacuum chamber. Pairs of nip rolls 24 and 25 contain the treatment gas within the tube in an area between electrodes 15' and 16' as the tube is continuously fed during cold plasma treatment. Bags can be formed according to the invention by heat sealing the ends of a section of the tube to enclose a food product or the treated tube can be slit to form a flat film which is then fabricated into a package by heat sealing. The tube may be heat shrinkable as noted above.

Although the present invention has been described herein in conjunction with preferred embodiments, it is to be understood that modifications and variations may be utilized without departing from the principles and scope of the invention, as those skilled in the art will readily understand. For example, the cook-in package could take other forms than that shown in the disclosed embodiment, such as a casing type cook-in package rather than a heat shrinkable package. Accordingly, such modifications and variations may be practiced within the scope of the following claims.

I Claim:

1. An article comprising:
   a) a film comprising an inside surface which comprises a polymer comprising a plurality of mer units derived from at least one olefinic monomer, said inside surface being heat sealed to at least a portion of said film so as to form a package, and
   b) enclosed within said package and contacting said inside layer, a meat product in an aqueous medium,
   said inside surface of said film having a surface energy of more than 44 dynes/cm while maintaining an ability to adhere in a well controlled and uniform manner to said meat product while said food product is cooked in said package.

2. The article of claim 1 wherein the heat seal of said package has a bond strength sufficient to resist seal failure during cooking of said meat product in said package.

3. The article of claim 1 wherein said inside surface of said film is heat sealed to itself.

4. The article of claim 1 wherein said film is in the form of tubing having said at least one heat seal at an end thereof to form a bag encasing said meat product.

5. The article of claim 4 wherein said bag is heat shrinkable.

6. The article of claim 1 wherein said package is heat shrinkable.

7. The article of claim 1 wherein said at least one olefinic monomer comprises ethylene or propylene.

8. The article of claim 1 wherein said polymer comprising a plurality of mer units derived from at least one olefinic monomer is polyethylene, polypropylene, or ethylene/vinyl acetate copolymer.

9. The article of claim 1 wherein said polymer comprising a plurality of mer units derived from at least one olefinic monomer is linear low density polyethylene.

10. The article of claim 9 wherein said film has a thickness of from about 25 to 250 microns.

11. The article of claim 1 wherein said film has a thickness of from about 25 to 250 microns.

12. The article of claim 1 wherein said inside surface of said film has a surface energy of at least 50 dynes/cm.

13. The article of claim 12 wherein said package is heat shrinkable.

14. The article of claim 12 wherein said at least one olefinic monomer comprises ethylene or propylene.

15. The article of claim 12 wherein said polymer comprising a plurality of mer units derived from at least one olefinic monomer is polyethylene, polypropylene, or ethylene/vinyl acetate copolymer.

16. The article of claim 12 wherein said polymer comprising a plurality of mer units derived from at least one olefinic monomer is linear low density polyethylene.

17. The article of claim 16 wherein said film has a thickness of from about 25 to 250 microns.

18. A process for making a food package, comprising:
   a) providing a film comprising an inside surface which comprises a polymer comprising a plurality of mer units derived from at least one olefinic monomer;
   b) in a confined region which has been evacuated to a pressure less than atmospheric pressure and to which a process gas other than air has been added, treating said inside surface of said film with a cold plasma so as to increase the surface energy of said inside layer;
   c) forming said film into an enclosure into which encases a proteinaceous food product in an aqueous medium, said food product contacting said inside layer of said film; and
   d) sealing said enclosure so as to form said food package.

19. The process of claim 18 wherein said process gas is highly oxidizing.

20. The process of claim 19 wherein said process gas comprises less than 30% nitrogen.

21. The process of claim 19 wherein said process gas consists essentially of oxygen.

22. The process of claim 18 wherein the treatment of said inside surface of said film results in said inside surface having a surface energy of more than 44 dynes/cm.

23. The process of claim 18 wherein the treatment of said inside surface of said film results in said inside surface having a surface energy of at least 50 dynes/cm.

24. The process of claim 18 wherein the treatment of said inside surface of said film results in a treatment depth of no more than 40 Angstroms.

25. The process of claim 18 wherein said film has a thickness of from about 25 to 250 microns.

26. The process of claim 18 wherein said film is heat shrinkable.

27. The process of claim 18 wherein said at least one olefinic monomer comprises ethylene or propylene.

28. The process of claim 18 wherein said polymer comprising a plurality of mer units derived from at least one olefinic monomer is linear low density polyethylene.

* * * * *